United States Patent
Kitatomi et al.

(10) Patent No.: US 12,161,991 B2
(45) Date of Patent: Dec. 10, 2024

(54) ACTIVATED CARBON AND METHOD FOR PRODUCING SAME

(71) Applicant: KURARAY CO., LTD., Kurashiki (JP)

(72) Inventors: Hiroaki Kitatomi, Bizen (JP); Mitsunori Nishita, Bizen (JP); Mitsunori Hitomi, Bizen (JP); Takayuki Yamada, Bizen (JP)

(73) Assignee: KURARAY CO., LTD., Kurashiki (JP)

( * ) Notice: Subject to any disclaimer, the term of this patent is extended or adjusted under 35 U.S.C. 154(b) by 708 days.

(21) Appl. No.: 17/429,361

(22) PCT Filed: Feb. 14, 2020

(86) PCT No.: PCT/JP2020/005866
§ 371 (c)(1),
(2) Date: Aug. 9, 2021

(87) PCT Pub. No.: WO2020/170985
PCT Pub. Date: Aug. 27, 2020

(65) Prior Publication Data
US 2022/0143572 A1 May 12, 2022

(30) Foreign Application Priority Data
Feb. 18, 2019 (JP) .................. 2019-026791

(51) Int. Cl.
*C01B 32/30* (2017.01)
*B01J 20/20* (2006.01)
*B01J 20/28* (2006.01)
*B01J 20/30* (2006.01)
*C01B 32/318* (2017.01)
*C01B 32/348* (2017.01)
*C01B 32/354* (2017.01)

(52) U.S. Cl.
CPC ......... *B01J 20/20* (2013.01); *B01J 20/28071* (2013.01); *B01J 20/28073* (2013.01); *B01J 20/28083* (2013.01); *B01J 20/28085* (2013.01); *B01J 20/28092* (2013.01); *B01J 20/3078* (2013.01); *B01J 20/3085* (2013.01); *C01B 32/318* (2017.08); *C01B 32/348* (2017.08); *C01B 32/354* (2017.08); *C01P 2002/72* (2013.01); *C01P 2006/14* (2013.01); *C01P 2006/17* (2013.01)

(58) Field of Classification Search
CPC ............................ C01B 32/30; C01B 32/354
See application file for complete search history.

(56) References Cited

U.S. PATENT DOCUMENTS

| | | | |
|---|---|---|---|
| 2005/0266990 A1 | 12/2005 | Iwasaki et al. | |
| 2007/0123420 A1 | 5/2007 | Hayashi et al. | |
| 2007/0270307 A1 | 11/2007 | Hamasaki et al. | |
| 2009/0038632 A1* | 2/2009 | Cashmore | B01J 20/20 521/88 |
| 2009/0080142 A1 | 3/2009 | Nanba et al. | |
| 2014/0104754 A1* | 4/2014 | Lipka | C01B 32/336 428/408 |
| 2015/0375197 A1 | 12/2015 | Yanagi et al. | |

FOREIGN PATENT DOCUMENTS

| | | |
|---|---|---|
| EP | 3421425 A1 | 1/2019 |
| JP | 2004059387 A | 2/2004 |
| JP | 2005132696 A | 5/2005 |
| JP | 2005295999 A | 10/2005 |
| JP | 2006015334 A | 1/2006 |
| JP | 2006104002 A | 4/2006 |
| JP | 2007119342 A | 5/2007 |
| JP | 2018028998 A | 2/2018 |
| WO | WO-2004011371 A1 | 2/2004 |
| WO | WO-2014129410 A1 | 8/2014 |
| WO | WO-2016035669 A1 | 3/2016 |

OTHER PUBLICATIONS

English translation of International Search Report issued Apr. 21, 2020 in PCT/JP2020/005866, 2 pages.
English translation of the International Preliminary Report on Patentability and Written Opinion issued Aug. 10, 2021 in PCT/JP2020/005866, 5 pages.
Extended European Search Report issued Oct. 20, 2022 in Patent Application No. 20759462.3, 7 pages.

* cited by examiner

*Primary Examiner* — Stuart L Hendrickson
(74) *Attorney, Agent, or Firm* — Element IP, PLC

(57) ABSTRACT

The present invention relates to an activated carbon, having a pore volume (A) of 0.3 to 0.7 mL/g at a pore diameter of 6.5 to 50 nm as determined by mercury intrusion porosimetry, a pore volume (B) of 0.23 mL/g or less at a pore diameter of 750 to 4,000 nm as determined by mercury intrusion porosimetry, and a pore volume ratio (A)/(B) of 1.7 or higher.

8 Claims, 2 Drawing Sheets

[Fig. 1]
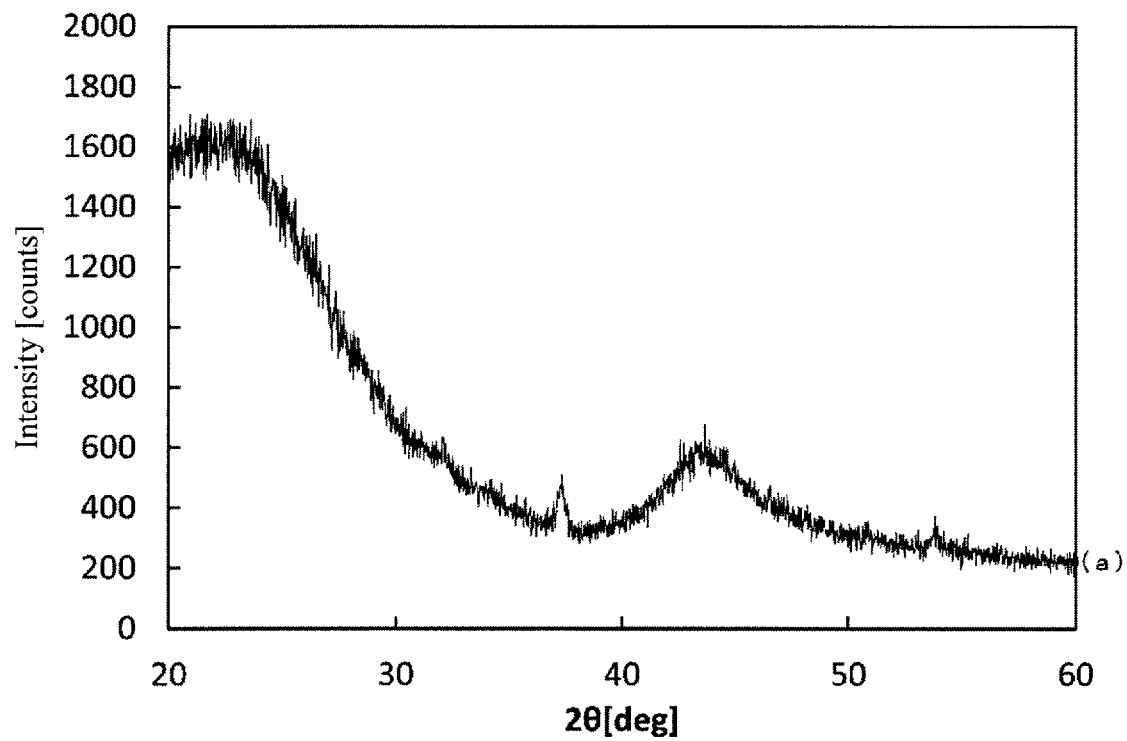
[Fig.2]
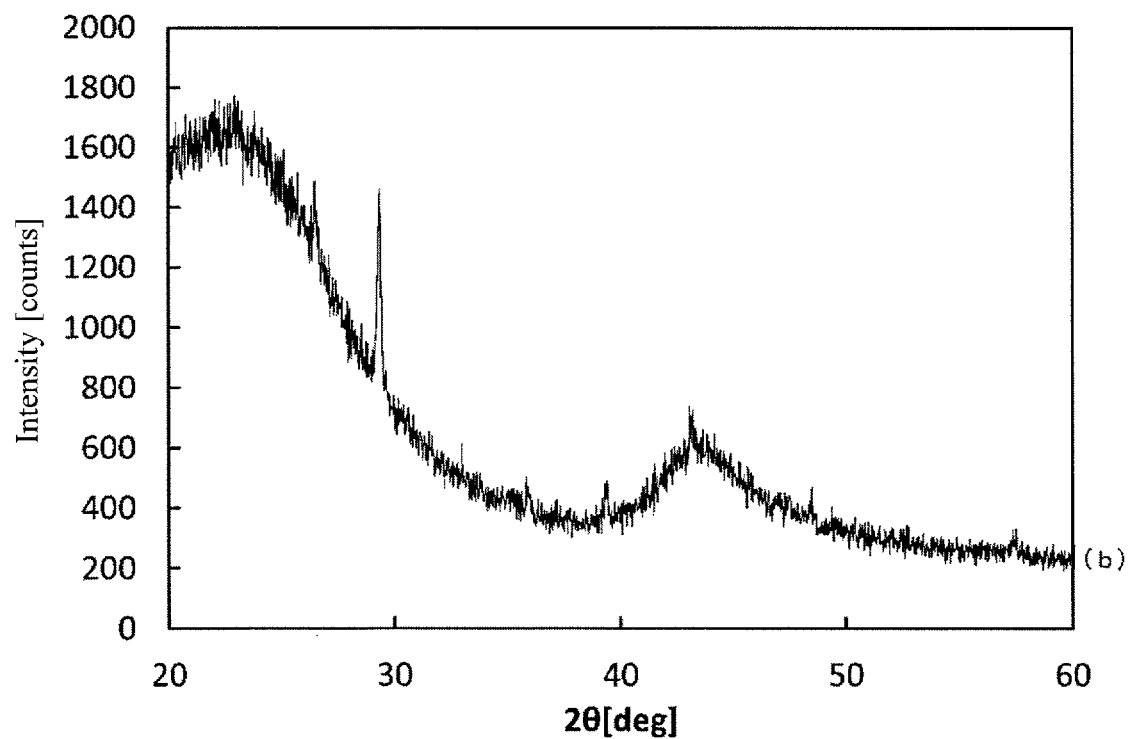

[Fig. 3]
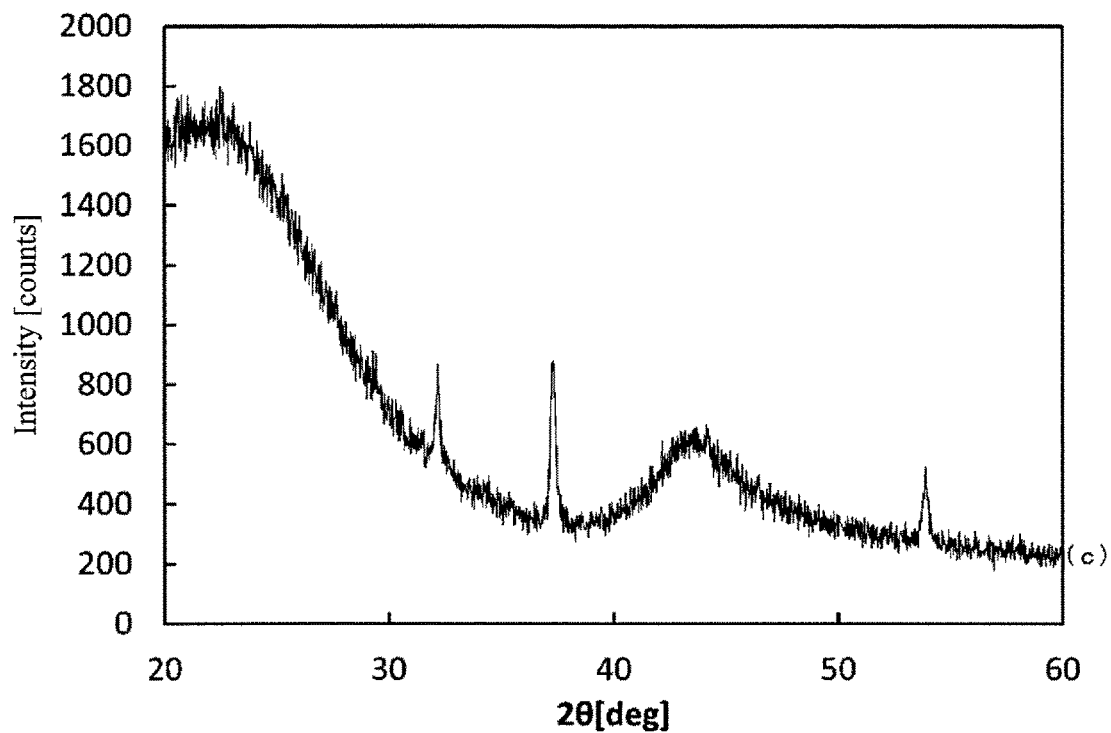
[Fig. 4]
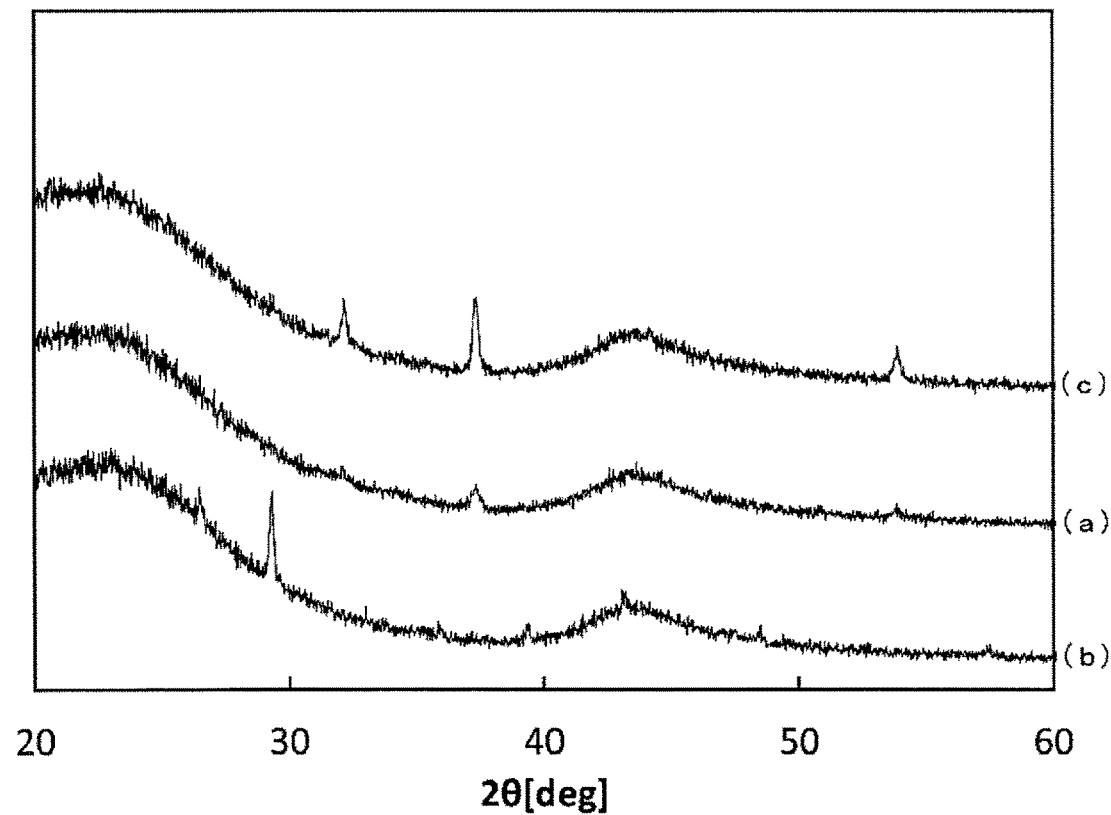

ACTIVATED CARBON AND METHOD FOR PRODUCING SAME

TECHNICAL FIELD

The present invention relates to an activated carbon and a method of producing the same.

BACKGROUND ART

Activated carbons have an excellent adsorption capacity and are thus widely used in liquid-phase treatments, such as removal of impurities from a liquid phase and concentration adjustment of dissolved components in a liquid phase.

The adsorption capacity of an activated carbon in a liquid-phase treatment is greatly affected by the compatibility between the properties of the activated carbon itself to be used, such as pore volume and pore distribution, and the properties of an adsorptive substance to be treated.

For example, Patent Document 1 discloses an activated carbon for decolorization in which pores in macropore ranges of 200 to 1,000 nm and 600 to 1,000 nm are developed, and it is disclosed that this activated carbon is produced by mixing and pulverizing two kinds of coal-based carbonaceous materials, press-molding and then crushing the resulting mixed powder, and heat-treating and subsequently activating the resultant.

Further, Patent Document 2 discloses an adsorbent for water treatment or medical use in which the volume of 0.02 to 10-μm pores is adjusted, and it is disclosed that this adsorbent is produced by carbonizing a phenolic resin as a raw material under specific temperature conditions and subsequently activating the resultant.

Moreover, Patent Document 3 discloses an activated carbon for solution adsorption treatment in which the pore volume of pores with a diameter of 2 to 30 nm, which is calculated from a nitrogen adsorption isotherm by the Cranston-Inkley method, is increased, and it is disclosed that this activated carbon is produced by impregnating a coconut shell-based activated carbon with a calcium component and activating the resultant.

PRIOR ART DOCUMENTS

Patent Documents

[Patent Document 1] Japanese Laid-Open Patent Publication No. 2006-104002
[Patent Document 2] Japanese Laid-Open Patent Publication No. 2006-15334
[Patent Document 3] WO 2014/129410

SUMMARY OF THE INVENTION

Problems to be Solved by the Invention

However, the activated carbon obtained in Patent Document 1 may be demanded to have a superior performance (e.g., higher decolorization performance) from the viewpoint of practical use. As for the activated carbon obtained in Patent Document 2, the disclosure is limited to that this activated carbon has an excellent rate of adsorbing DL-β-aminoisobutyric acid and an excellent methylene blue decolorization performance, and there is no mention with regard to the decolorization performance in a liquid phase for a color matter having a larger molecular size. Further, the activated carbon obtained in Patent Document 3 may be demanded to have a higher hardness from the viewpoint of practical use.

The present invention was made in view of the above-described circumstances, and an object of the present invention is to provide: an activated carbon which has an excellent decolorization performance in a liquid phase while maintaining a high hardness; and a method of producing the same.

Means for Solving Problems

The present inventors intensively studied to find that the above-described problems can be solved by an activated carbon which has specific values for the pore volumes at specific pore diameters and the specific pore volume ratio, thereby completing the present invention.

The present invention encompasses the following preferred embodiments.

[1] An activated carbon, having a pore volume (A) of 0.3 to 0.7 mL/g at a pore diameter of 6.5 to 50 nm as determined by mercury intrusion porosimetry, a pore volume (B) of 0.23 mL/g or less at a pore diameter of 750 to 4,000 nm as determined by mercury intrusion porosimetry, and a pore volume ratio (A)/(B) of 1.7 or higher.

[2] The activated carbon according to [1], having a pore volume (C) of 0.18 mL/g or less at a pore diameter of 300 to 750 nm as determined by mercury intrusion porosimetry, and a pore volume ratio (A)/(C) of 2.5 or higher.

[3] The activated carbon according to [1] or [2], wherein a raw material of the activated carbon is a coconut shell-derived activated carbon.

[4] The activated carbon according to any one of [1] to [3], which is an activated carbon for a liquid-phase treatment.

[5] A method of producing the activated carbon according to any one of [1] to [4], comprising the step of activating a precursor activated carbon having an elemental potassium content of 0.5% by mass or less and an elemental calcium content of 0.4 to 4% by mass.

[6] The method according to [5], wherein the precursor activated carbon has a diffraction peak at a diffraction angle 2θ of 37.6±0.3° in an X-ray diffraction pattern.

[7] The method according to [5] or [6], wherein the precursor activated carbon has a diffraction peak derived from calcium oxide in an X-ray diffraction pattern.

[8] The method according to any one of [5] to [7], comprising the steps of:
adjusting a raw material activated carbon to have an elemental potassium content of 0.5% by mass or less;
adjusting the raw material activated carbon to have an elemental calcium content of 0.4 to 4% by mass;
preheating the thus adjusted raw material activated carbon to obtain the precursor activated carbon; and
activating the precursor activated carbon.

Effects of the Invention

According to the present invention, an activated carbon which has an excellent decolorization performance in a liquid phase while maintaining a high hardness, and a method of producing the same can be provided.

BRIEF DESCRIPTION OF DRAWINGS

FIG. 1 is an X-ray diffraction pattern of the precursor activated carbon (raw material activated carbon prior to the secondary activation step) obtained in Example 2.

FIG. 2 is an X-ray diffraction pattern of the raw material activated carbon prior to the secondary activation step which was obtained in Comparative Example 2.

FIG. 3 is an X-ray diffraction pattern of the precursor activated carbon obtained in Reference Example 1.

FIG. 4 is a compilation of the X-ray diffraction patterns of FIGS. 1 to 3.

MODE FOR CARRYING OUT THE INVENTION

Embodiments of the present invention will now be described in detail. However, the scope of the present invention is not restricted to the below-described embodiments, and various modifications can be made within a range that does not impair the gist of the present invention.

[Activated Carbon]

The present inventors thought that, in order to achieve both satisfactory hardness and satisfactory decolorization performance, it is effective to increase the volume of mesopores regarded as adsorption sites and reduce the volume of macropores causing a low hardness at the same time, and the present inventors thus intensively studied the control of pore structure so as to realize this. However, an increase in the volume of mesopores to a desired amount leads to an increase in the volume of macropores, and this causes a reduction in the hardness; therefore, it is extremely difficult to achieve both satisfactory hardness and satisfactory decolorization performance.

Surprisingly, the present inventors found that, as described below, an activated carbon having both an increased mesopore volume and a reduced macropore volume can be obtained by activating a precursor activated carbon which has specific values of elemental potassium content and elemental calcium content and in which a calcium compound serving as an elemental calcium source exists on the surface or in the pores at a crystallite size large enough to give the specific pore structure of the present invention.

Accordingly, the activated carbon of the present invention has a pore structure with both an increased mesopore volume and a reduced macropore volume. That is, in the activated carbon of the present invention: a pore volume (A) at a pore diameter of 6.5 to 50 nm is 0.3 to 0.7 ml/g as determined by mercury intrusion porosimetry; a pore volume (B) at a pore diameter of 750 to 4,000 nm is 0.23 mL/g or less as determined by mercury intrusion porosimetry; and a pore volume ratio (A)/(B) is 1.7 or higher.

Pores having a diameter of 6.5 to 50 nm mainly function as adsorption sites. Accordingly, when the pore volume (A) at a pore diameter of 6.5 to 50 nm is less than 0.3 mL/g, it is difficult to obtain desired adsorption characteristics (decolorization performance). Meanwhile, when the pore volume (A) is larger than 0.7 mL/g, since the volume of macropores causing a reduction in the hardness tends to be increased as well, it is difficult to obtain a desired hardness.

From the viewpoint of obtaining a superior decolorization performance and a higher hardness, the pore volume (A) is preferably 0.4 to 0.7 mL/g, more preferably 0.5 to 0.6 mL/g.

The pore volume (B) at a pore diameter of 750 to 4,000 nm is likely to affect the hardness of the activated carbon. When this pore volume (B) is larger than 0.23 mL/g, it is difficult to obtain a desired hardness.

From the viewpoint of obtaining a higher hardness, the pore volume (B) is preferably 0.22 mL/g or less, more preferably 0.21 mL/g or less. A lower limit value of the pore volume (B) is not particularly restricted. The pore volume (B) is usually 0.08 mL/g or larger.

The smaller the pore volume (B), the more likely a high hardness is obtained. However, when the pore volume (B) and the pore volume (A) are both small, it is difficult to obtain a desired decolorization performance. Therefore, in the present invention, the pore volume ratio (A)/(B) is 1.7 or higher.

From the viewpoint of obtaining both satisfactory hardness and satisfactory decolorization performance, the ratio (A)/(B) is preferably 2.0 or higher, more preferably 2.1 or higher, still more preferably 2.2 or higher, yet still more preferably 2.3 or higher, particularly preferably 2.5 or higher. An upper limit value of the ratio (A)/(B) is not particularly restricted. The ratio (A)/(B) is usually 3.5 or lower.

The activated carbon of the present invention can have both a high hardness and an excellent decolorization performance since the specific pore volumes (A) and (B) are specific values and their ratio (A)/(B) is a specific value.

The pore volumes (A) and (B) as well as their ratio (A)/(B) can be adjusted by activating the above-described specific precursor activated carbon at an appropriate activation yield. The pore volumes (A) and (B) and the below-described pore volume (C) can be measured by the method in the section of Examples described below.

From the viewpoint of obtaining a higher hardness, the pore volume (C) at a pore diameter of 300 to 750 nm, which is determined by mercury intrusion porosimetry, is preferably 0.18 mL/g or less, more preferably 0.16 mL/g or less, particularly preferably 0.15 mL/g or less.

Further, from the viewpoint of obtaining more favorable hardness and decolorization performance, a ratio of the pore volume (A) with respect to the pore volume (C), (A)/(C), is preferably 2.5 or higher, more preferably 3.0 or higher, particularly preferably 3.3 or higher.

Accordingly, from the viewpoint of obtaining an activated carbon having both a higher hardness and a superior decolorization performance, in one preferred embodiment of the present invention, the pore volume (C) at a pore diameter of 300 to 750 nm is 0.18 mL/g or less as determined by mercury intrusion porosimetry, and the pore volume ratio (A)/(C) is 2.5 or higher.

A lower limit value of the pore volume (C) and an upper limit value of the ratio (A)/(C) are not particularly restricted. Usually, the pore volume (C) is 0.02 mL/g or larger, and the ratio (A)/(C) is 4.7 or lower.

The pore volume (C) as well as the ratio of the pore volume (A) with respect to the pore volume (C), (A)/(C), can be adjusted by activating the above-described precursor activated carbon at an appropriate activation yield.

The activated carbon of the present invention has the above-described pore volumes (A) and (B) at specific pore diameters as well as a specific pore volume ratio (A)/(B) and is, therefore, suitable for the use in a liquid-phase treatment. Accordingly, in one embodiment of the present invention, the activated carbon of the present invention is an activated carbon for a liquid-phase treatment. Further, the activated carbon of the present invention which has a high hardness is useful for a liquid-phase treatment in which an adsorption column, an adsorption tower or the like is used.

In the present invention, a liquid phase may be any material which exists as a liquid phase under ordinary treatment conditions. Examples of the liquid phase include solutions, dispersions, emulsions, microemulsions, suspensions, oils, and alcohols.

Examples of the liquid-phase treatment include treatments for removing impurities from a liquid phase, and treatments for adjusting the concentration of dissolved components in a liquid phase. In one embodiment of the present invention, the liquid-phase treatment is a treatment of removing a coloring component from a liquid phase (decolorization treatment).

The decolorization performance of the activated carbon of the present invention can be evaluated by, for example, using a dye Solophenyl RED 3BL (hereinafter, may be referred to as "SPR") in accordance with the method in the section of Examples described below. The SPR decolorization performance (adsorption amount) is preferably 170 mg/g or higher, more preferably 250 mg/g or higher, particularly preferably 300 mg/g or higher.

The hardness of the activated carbon of the present invention can be evaluated in terms of microstrength hardness (hereinafter, may be referred to as "MS hardness"). The MS hardness is preferably 68.0% or higher, more preferably 69.0% or higher, particularly preferably 70.0% or higher. The MS hardness is an index of the resistance against a weight load and can be measured by the method in the section of Examples described below. When the activated carbon has an MS hardness of the above-described value or higher, the dust generation caused by the self-weight of the activated carbon can be likely to be reduced in the case of using the activated carbon by filling it into an adsorption column, an adsorption tower or the like.

The hardness of the activated carbon of the present invention can also be evaluated in terms of the hardness measured in accordance with JIS K1474 (hereinafter, may be referred to as "JIS hardness"). The JIS hardness is preferably 80.0% or higher, more preferably 82.0% or higher, particularly preferably 85.0% or higher. When the activated carbon has a JIS hardness of the above-described value or higher, a trouble caused by dust generated from the activated carbon can be likely to be prevented in the case of using the activated carbon for a liquid-phase treatment.

The above-described decolorization performance, MS hardness and JIS hardness can each be adjusted to be a desired value by activating the above-described precursor activated carbon at an appropriate activation yield.

The activated carbon which has been used in a liquid-phase treatment and thus has a reduced adsorption performance can be recycled by a prescribed treatment and reused.

[Method of Producing Activated Carbon]

The activated carbon of the present invention can be obtained by, for example, a production method (hereinafter, may be referred to as "Production Method 1") which comprises the step (hereinafter, may be referred to as "secondary activation step") of activating a precursor activated carbon (hereinafter, may be referred to as "precursor activated carbon (Y)") having an elemental potassium content of 0.5% by mass or less and an elemental calcium content of 0.4 to 4% by mass.

The present inventors found that, by activating the precursor activated carbon (Y) which has a specific elemental potassium content and a specific elemental calcium content and in which a calcium compound serving as an elemental calcium source exists on the surface or in the pores at a crystallite size large enough to give the specific pore structure of the present invention, an excessive increase in the macropore volume can be inhibited while allowing the mesopore volume to increase and, therefore, the activated carbon of the present invention which has specific pore volumes (A) and (B) as well as a specific ratio (A)/(B) can be produced. The reason for this can be presumed to be the following action mechanism. In a conventional production method, macropores are developed during the secondary activation step of the precursor activated carbon (Y) due to aggregation of overly fine crystallites of the calcium compound; however, in the production method of the present invention, it can be considered that such development of macropores is inhibited while crystallites of the calcium compound that are large enough to give a specific pore structure contribute to an increase in the mesopore volume of the precursor activated carbon (Y) having a specific elemental potassium content and a specific elemental calcium content in the secondary activation step. It is explicitly noted here that the above-described production method is within the scope of the present invention even if the reason why (action mechanism by which) the activated carbon of the present invention having a controlled pore structure can be produced by the above-described production method is different from the one described above.

The calcium compound in the state of crystallites large enough to give the specific pore structure of the present invention can be allowed to exist on the surface or in the pores of the precursor activated carbon (Y) by, for example, adhering the calcium compound in the state of crystallites large enough to give the specific pore structure to a raw material activated carbon in the below-described calcium contact step, or performing the below-described preheating step on a raw material activated carbon having a specific elemental potassium content and a specific elemental calcium content.

Accordingly, the activated carbon of the present invention can be obtained by a production method which comprises the steps of: preheating an elemental calcium-containing raw material activated carbon having an elemental potassium content of 0.5% by mass or less and an elemental calcium content of 0.4 to 4% by mass to obtain a precursor activated carbon (Y); and activating the thus obtained precursor activated carbon (Y).

The calcium compound (calcium oxide in one embodiment) in the state of crystallites large enough to give a specific pore structure, which exists on the precursor activated carbon (Y), can be confirmed by, for example, X-ray diffractometry or Raman spectroscopy.

Accordingly, the activated carbon of the present invention can also be obtained by a production method (hereinafter, may be referred to as "Production Method 2") in which the precursor activated carbon (Y) has a diffraction peak at a diffraction angle $2\theta$ of $37.6\pm0.3°$ in an X-ray diffraction pattern. The expression "have a diffraction peak" used in the present invention means that, when a baseline is taken near a peak in an X-ray diffraction pattern, the intensity of the peak from the baseline is 100 or higher. Further, the position of the diffraction peak means a peak top.

The diffraction peak at a diffraction angle $2\theta$ of $37.6\pm0.3°$ is derived from calcium oxide. Accordingly, the activated carbon of the present invention can also be obtained by a production method (hereinafter, may be referred to as "Production Method 3") in which the precursor activated carbon (Y) has a diffraction peak derived from calcium oxide in an X-ray diffraction pattern.

In one embodiment, the term "crystallites large enough to give the specific pore structure of the present invention" means, for example, crystallites that are large enough to be confirmed by X-ray diffractometry, Raman spectroscopy or the like. When X-ray diffractometry is employed in such an embodiment, the presence of "crystallites large enough to give the specific pore structure of the present invention" can be confirmed by that the precursor activated carbon (Y) "has a specific diffraction peak" and, usually, the intensity of the peak can be affected by a sample preparation technique, a measurement instrument, measurement conditions and the like. Additionally, the intensity of the peak can be affected by the amount of the calcium compound brought into contact, as well as the below-described preheating temperature, temperature increase rate, retention time of preheating temperature and the like. Further, a measurement sample is the precursor activated carbon (Y); therefore, in another embodiment, there is a case where a diffraction peak does not appear clearly [i.e. the precursor activated carbon (Y) is not necessarily considered to "have a diffraction peak"] as in the case where the measurement sample is the calcium compound alone. In other words, even if a calcium compound in the state of crystallites large enough to give a specific pore structure exists on the surface or in the pores of the precursor activated carbon (Y), a particular diffraction peak in an X-ray diffraction pattern may not be large enough to consider the precursor activated carbon (Y) to "have a diffraction peak" as in the present invention when, for example, the calcium content is a lower limit value of 0.4% by mass or close to this value, or the below-described retention time of preheating temperature is a lower limit value of 0 minutes or close to this value. However, even in such a case, as long as the precursor activated carbon (Y) has a specific elemental potassium content and a specific elemental calcium content and a calcium compound in the state of crystallites large enough to give a specific pore structure exists on the surface or in the pores of the precursor activated carbon (Y), the activated carbon of the present invention can be obtained by a production method which comprises the step of performing secondary activation of the precursor activated carbon (Y).

Moreover, usually, the value of the diffraction angle $2\theta$ can also be affected by a sample preparation technique, a measurement instrument, measurement conditions and the like. Accordingly, as defined in an arbitrary embodiment described in the present specification, the diffraction angle $2\theta$ may vary by an amount of, for example, $\pm 0.3°$. Taking into consideration this error, in the present specification, the value of the diffraction angle $2\theta$ is indicated as "measured value$\pm 0.3°$".

An X-ray diffraction pattern can be measured by the method in the section of Examples described below.

In the above-described Production Methods 1 to 3, the elemental potassium content and the elemental calcium content can be adjusted to be prescribed values by the below-described "potassium reduction step" and "calcium contact step", respectively.

In one embodiment of the present invention, the activated carbon of the present invention can be obtained by a production method which comprises:

the step of adjusting a raw material activated carbon to have an elemental potassium content of 0.5% by mass or less (hereinafter, may be referred to as "potassium reduction step");

the step of adjusting the raw material activated carbon to have an elemental calcium content of 0.4 to 4% by mass (hereinafter, may be referred to as "calcium contact step");

the step of preheating the raw material activated carbon after the adjusting steps to obtain above-described precursor activated carbon (Y) (hereinafter, may be referred to as "preheating step"); and the step of activating the precursor activated carbon (Y) (secondary activation step).

An activated carbon is obtained by acid-washing the precursor activated carbon (Y) after the secondary activation step (hereinafter, may be referred to as "acid-washing step").

The term "activated carbon" used herein refers to an activated carbon obtained after the acid-washing. The term "raw material activated carbon" used herein refers to an activated carbon which is obtained by an activation treatment (primary activation treatment) of an activated carbon precursor (X) and used as a raw material of the activated carbon of the present invention, and this activated carbon is in a stage prior to being subjected to the preheating step (including an activated carbon in the middle of the preheating step before completion). Further, the term "precursor activated carbon (Y)" used herein refers to an activated carbon which has a specific elemental potassium content and a specific elemental calcium content and in which a calcium compound serving as an elemental calcium source exists on the surface or in the pores at a crystallite size large enough to give a specific pore structure, or an activated carbon which is obtained after a preheating treatment of a raw material activated carbon having a specific elemental potassium content and a specific elemental calcium content.

The raw material activated carbon is preferably a coconut shell-derived activated carbon. Accordingly, in a preferred embodiment of the present invention, the raw material of the activated carbon of the present invention is a coconut shell-derived activated carbon.

When the raw material activated carbon is derived from a coconut shell, every particle of the raw material activated carbon has tissue pores "sieve tubes" and "vessels" that are unique to the coconut shell; therefore, an elemental calcium source can be readily diffused inside the particles of the raw material activated carbon, so that the development of pores can be likely to be facilitated during the activation step. In addition, such a raw material activated carbon is available in a large amount and thus commercially advantageous as well.

A palm used as a raw material of the coconut shell is not particularly restricted. Examples thereof include oil palm, coconut palm, Salak, and double coconut. Coconut shells obtained from these palms may be used singly, or in combination of two or more kinds thereof. Among such coconut shells, those obtained from coconut palm or oil palm, which are biomass waste generated in large amounts when coconut palm or oil palm is used as a food, a detergent raw material, a biodiesel oil raw material or the like, are readily available at a low price and thus particularly preferred.

A coconut shell can be obtained in the form of a pre-calcined char (coconut shell char), and this is preferably used as the activated carbon precursor (X). Alternatively, a char may be produced from a coconut shell and used as the activated carbon precursor (X). A method of producing the char is not particularly restricted, and the char can be produced by any method known in the art. For example, a coconut shell used as a raw material is calcined (carbonization treatment) at a temperature of about 400 to 800° C. under an atmosphere of a gas, such as nitrogen, carbon dioxide, helium, argon, carbon monoxide or a fuel-combustion gas, a mixture of these gases, or a mixed gas of the above-described gas and other gas which contains the above-described gas as a main component, whereby a coconut shell char can be produced.

The raw material activated carbon used in the present invention can be obtained by, for example, an activation treatment (primary activation treatment) of the above-described activated carbon precursor (X) (coconut shell char).

This activation treatment is a treatment for forming pores on the surface of the activated carbon precursor (X) and thereby converting the activated carbon precursor (X) into a porous carbonaceous material, and this treatment can yield an activated carbon (raw material activated carbon) having larger specific surface area and pore volume. In a case where the activated carbon precursor (X) is used as a raw material activated carbon without the primary activation treatment, the resulting carbonaceous material does not have adequate specific surface area and pore volume, and this makes it difficult to obtain a sufficient effect in, for example, the removal of impurities from a liquid phase or the concentration adjustment of dissolved components in a liquid phase when the carbonaceous material is used in a liquid-phase treatment.

The primary activation treatment can be performed by heating the activated carbon precursor (X) at a temperature of 800° C. or higher, preferably 830 to 1,000° C., under a mixed gas atmosphere of two or more gases selected from the group consisting of propane combustion gas, water vapor, nitrogen, and carbon dioxide using a general furnace such as a fluidized furnace, a multistage furnace, or a rotary furnace (e.g., a rotary kiln).

Gas partial pressures in this process are not particularly restricted; however, the water vapor partial pressure, the carbon dioxide partial pressure, and the nitrogen partial pressure are preferably 7.5 to 50%, 10 to 50% and 30 to 80%, respectively. It is noted here that a total pressure of the gases is usually 1 atm (about 0.1 MPa).

A total amount of the mixed gas to be supplied during the primary activation is about 1 to 50 L/min with respect to 100 g of a sample to be activated. When the total amount of an activation gas to be supplied is in this range, an activation reaction can be likely to proceed more efficiently.

In the present invention, the specific surface area of the raw material activated carbon calculated by the BET method (hereinafter, may be referred to as "BET specific surface area") is preferably 900 m$^2$/g to 1,500 m$^2$/g. When the BET specific surface area of the raw material activated carbon is in this range, an activated carbon having physical properties sufficient for the use in a liquid-phase treatment can be likely to be obtained.

<Potassium Reduction Step>

In the above-described production method, elemental potassium contained in the raw material activated carbon is reduced to 0.5% by mass or less. The reason for this is because, when elemental potassium exists in abundance, an increase in the micropore volume rather than an increase in the volume of meso- to macro-pores suitable for a liquid-phase treatment can be likely to be facilitated in the secondary activation step performed after a contact with an elemental calcium source. Therefore, when the amount of elemental potassium contained in the raw material activated carbon is higher than 0.5% by mass, it is difficult to obtain the pore volumes (A) and (B) at specific pore diameters and the specific pore volume ratio (A)/(B) according to the activated carbon of the present invention. The elemental potassium content of the raw material activated carbon is preferably 0.4% by mass or less, more preferably 0.3% by mass or less. When the elemental potassium content is equal to or less than the above value, a desired pore structure can be likely to be obtained. The elemental potassium content can be measured by the method in the section of Examples described below. A lower limit value of the elemental potassium content is 0.0% by mass, which is the detection limit of the measurement method.

A method of reducing elemental potassium is not particularly restricted, and examples thereof include washing with an acid-containing washing liquid, and replacement of a potassium component with other component (e.g., calcium component) by an ion-exchange action.

<Calcium Contact Step>

An elemental calcium source is brought into contact with the raw material activated carbon in which the amount of potassium has been reduced by the above-described potassium reduction step. By this step, the elemental calcium source is adhered to the surface and pores of the raw material activated carbon. The elemental calcium content in the raw material activated carbon after the contact is 0.4 to 4% by mass. When the elemental calcium content is outside of this range, it is difficult to obtain the pore volumes (A) and (B) at specific pore diameters and the specific pore volume ratio (A)/(B) according to the activated carbon of the present invention, even with the subsequent secondary activation step and acid treatment step. The elemental calcium content in the raw material activated carbon after the contact is preferably 0.5 to 3.5% by mass, more preferably 0.9 to 3.5% by mass, particularly preferably 1.0 to 3.5% by mass. When the elemental calcium content is in this range, a desired pore structure can be likely to be obtained. The elemental calcium content can be measured by the method in the section of Examples described below.

The elemental calcium source is not particularly restricted and, for example, a water-insoluble calcium compound or a water-soluble calcium compound can be used. Such a calcium compound may be used singly, or in combination of two or more kinds thereof.

Examples of the water-insoluble calcium compound include calcium carbonate and calcium hydroxide. From the viewpoint of the safety in handling, it is preferred to use calcium carbonate.

From the viewpoint of more easily enabling uniform adhesion of the elemental calcium source by contact in the form of an aqueous solution, it is preferred to use a water-soluble calcium compound. Specific examples of the water-soluble calcium compound include calcium chloride, calcium nitrate, and calcium acetate. Thereamong, calcium nitrate is preferred since it has a high solubility and is readily available at a low price. Further, from the viewpoint of reducing the environmental load in view of waste liquid treatment and the like, it is preferred to use calcium chloride or calcium acetate.

As a method of bringing the elemental calcium source into contact, any method may be employed as long as the elemental calcium source can be adhered to the raw material activated carbon. Examples of such a method include a method of spraying an aqueous solution of the elemental calcium source to the raw material activated carbon, a method of immersing the raw material activated carbon into a solution of the elemental calcium source, and a method of mixing the raw material activated carbon with the elemental calcium source in a powder form. Thereamong, a method of bringing the elemental calcium source as an aqueous solution into contact with the raw material activated carbon by spraying, immersion or the like is preferred since it can be likely to allow the elemental calcium source to uniformly adhere to the surface and pores of the raw material activated carbon.

When the elemental calcium source is brought into contact as an aqueous solution, the aqueous solution may have any concentration that gives a desired elemental calcium content. This concentration is, for example, 1 to 25% by mass.

In the immersion method which is one of the above-described calcium contact methods, since the potassium component in the raw material activated carbon can be discharged into the aqueous solution by ion-exchange with the calcium component, the potassium reduction step and the calcium contact step can both be performed simultaneously.

When the elemental calcium source is used in the form of an aqueous solution in the calcium contact step, the raw material activated carbon after the contact with the elemental calcium source is usually dried before the subsequent preheating step; however, the raw material activated carbon after sufficient removal of water may be directly subjected to a preheating treatment.

<Preheating Step>

In one embodiment, the raw material activated carbon after the adjustments of the elemental potassium content and the elemental calcium content is subjected to a preheating treatment to obtain a precursor activated carbon (Y).

In one embodiment, a diffraction peak considered to be derived from calcium oxide can be detected when X-ray diffractometry is performed for the thus obtained precursor activated carbon (Y). According to this, surprisingly, it is considered that an application of a mild thermal history to the raw material activated carbon by the preheating step leads to the formation of calcium oxide in the state of crystallites large enough to give a specific pore structure, even when an elemental calcium source of a small size is brought into contact with the raw material activated carbon (for example, when an elemental calcium source in the form of an aqueous solution is brought into contact with the raw material activated carbon, i.e. when an elemental calcium source, which has a small size and is dissolved in water, is adhered to the raw material activated carbon), and in one embodiment, the sizes of the crystallites are large enough that the precursor activated carbon (Y) is considered to "have a diffraction peak" in the X-ray diffractometry. It is also considered as follows: by the preheating step, calcium oxide is developed into large crystallites to a certain extent and efficiently consumes carbon of the precursor activated carbon (Y) through catalytic reaction in the subsequent secondary activation step; therefore, while an increase in the mesopore volume is facilitated, the development of macropores by activation performed in a state where overly fine crystallites of a calcium compound are highly dispersed or in a state where overly fine crystallites of a calcium compound are aggregated is inhibited, so that the specific pore structure according to the present invention can be realized. The preheating step is usually not performed in the prior art since, for example, it increases the number of production steps (i.e. reduces the production efficiency); therefore, it is surprising that, as described above, the preheating step leads to the formation of calcium oxide in the state of large crystallites and affects the crystallite size of calcium oxide, and the crystallite size affects the pore structure, resulting in the formation of controlled pores.

Meanwhile, it is considered that, when an elemental calcium source of a small size is brought into contact with the raw material activated carbon and the secondary activation is performed without a preheating treatment, by catalytic reaction of a calcium compound adhering to the raw material activated carbon in a state where the crystallites of the calcium compound are undeveloped (i.e. in a state where the calcium compound is in the form of overly fine crystallites or the overly fine crystallites are aggregated), the mesopore volume is increased while an increase in the micropore volume or the macropore volume is also facilitated.

The preheating treatment can be performed by, in an apparatus capable of applying a mild thermal history to the elemental calcium source (e.g., a fluidized furnace, a multistage furnace, or a rotary furnace such as a rotary kiln), heating the raw material activated carbon under an inert gas atmosphere (e.g., under an atmosphere of nitrogen, helium, argon, or a mixed gas thereof), for example, from a temperature of 400 to 600° C. to a temperature of 880 to 980° C., preferably from a temperature of 450 to 550° C. to a temperature of 900 to 950° C., at a temperature increase rate of, for example, 8 to 20° C./min, preferably 10 to 18° C./min, and subsequently maintaining the temperature for a period of, for example, 0 to 180 minutes, preferably 0 to 60 minutes.

In another embodiment, the preheating step does not have to be performed. This embodiment is of a case where an elemental calcium source having a crystallite size large enough to give a specific pore structure has been adhered to the raw material activated carbon in the calcium contact step. A precursor activated carbon (Y) in which a calcium compound exits on the surface or in the pores at a crystallite size large enough to a specific pore structure can be obtained even without performing the preheating step after the calcium contact step.

<Secondary Activation Step>

A secondary activation treatment is performed on the precursor activated carbon (Y). This secondary activation treatment is the same as the above-described "primary activation treatment", except that the precursor activated carbon (Y) is used as a material to be activated in place of the activated carbon precursor (X).

<Acid-Washing Step>

After the secondary activation step, the precursor activated carbon (Y) is washed with an acid-containing washing liquid to remove impurities such as metal components contained in the precursor activated carbon (Y). The acid-washing can be performed by, for example, immersing the precursor activated carbon (Y) after the secondary activation step into the acid-containing washing liquid. In the acid-washing step, the precursor activated carbon (Y) after the secondary activation may be washed with water after acid-washing, or acid-washing and water-washing may be combined as appropriate by, for example, repeating acid-washing and water-washing. Further, the acid component may be removed by heating.

As the acid contained in the washing liquid, it is preferred to use an inorganic acid, such as hydrochloric acid, sulfuric acid or nitric acid, or an organic acid, for example, a saturated carboxylic acids such as formic acid, acetic acid, propionic acid, oxalic acid, tartaric acid or citric acid, or an aromatic carboxylic acid such as benzoic acid or terephthalic acid. Among these acids, it is more preferred to use hydrochloric acid which hardly oxidizes the precursor activated carbon (Y) after the secondary activation step. When hydrochloric acid is used as the acid-containing washing liquid, the concentration of hydrochloric acid is preferably 0.1 to 10.0% by mass, more preferably 0.3 to 6.0% by mass. When the concentration of hydrochloric acid is excessively low, it is necessary to increase the number of acid-washing operations for the removal of impurities, whereas when the concentration of hydrochloric acid is excessively high, the amount of residual hydrochloric acid is large. Therefore, the acid-washing step can be efficiently performed by controlling the concentration to be in the above-described range, which is preferred from the viewpoint of productivity.

The liquid temperature during the acid-washing and the water-washing is not particularly restricted; however, it is preferably 0 to 100° C., more preferably 10 to 100° C., still more preferably 15 to 95° C. The temperature of the washing liquid during immersion of the precursor activated carbon (Y) after the secondary activation step is preferably in the above-described range since this enables to perform the washing in a practical time while reducing the load on an apparatus.

The activated carbon of the present invention can be obtained by drying the thus acid-washed activated carbon. A drying method is not particularly restricted, and any known drying method may be employed. The drying may be performed by using, for example, a natural convection constant-temperature dryer, a forced convection constant-temperature dryer, or a vibration fluidized bed dryer. The drying temperature is preferably 80 to 150° C. A weight loss of the activated carbon after the drying is preferably 5% by mass or less.

The activated carbon of the present invention produced in the above-described manner has the pore volumes (A) and (B) at specific pore diameters as well as a specific pore volume ratio (A)/(B), and is thereby capable of having a high hardness and exhibiting an excellent decolorization performance in a liquid-phase treatment.

EXAMPLES

The present invention will now be described in more detail by way of Examples thereof; however, the present invention is not restricted thereto by any means.

The BET specific surface area, the average particle size and the elemental metal content of a raw material activated carbon, the X-ray diffraction pattern of a precursor activated carbon (Y), as well as the average particle size and the pore volume of an activated carbon were determined in accordance with the below-described methods. Further, the SPR adsorption amount, the MS hardness and the JIS hardness of each activated carbon obtained in Examples and Comparative Examples were evaluated in accordance with the below-described methods.

<BET Specific Surface Area of Raw Material Activated Carbon>

The BET specific surface area of a raw material activated carbon was measured using a high-precision surface area/pore distribution analyzer ("BELSORP 28SA" manufactured by MicrotracBEL Corporation). After vacuum-degassing a measurement sample at 300° C. for 5 hours, a nitrogen adsorption isotherm at 77 K was measured. Using the thus obtained adsorption isotherm, a multi-point analysis was performed by the BET method, and the specific surface area was calculated from a straight line in a region of relative pressure $P/P_0$=0.01 to 0.1 on the thus obtained curve.

<Average Particle Size>

For the evaluation of the elemental metal content of a raw material activated carbon and the decolorization performance of an activated carbon, it is necessary to pulverize the raw material activated carbon or the activated carbon such that it has a prescribed average particle size. Therefore, the average particle size was measured for the thus pulverized raw material activated carbon or activated carbon by a laser diffraction method.

Specifically, a dispersion which was obtained by mixing the powder-form raw material activated carbon or activated carbon to be measured with a surfactant and ion-exchanged water was measured by a transmission method using a laser diffraction-scattering particle size distribution analyzer ("MT3300I1" manufactured by MicrotracBEL Corporation). It is noted here that the concentration of the powder-form activated carbon in the dispersion was adjusted to be in the measurement concentration range indicated on the analyzer. As the surfactant used in the preparation of the dispersion, "polyoxyethylene (10) octylphenyl ether" manufactured by Wako Pure Chemical Industries, Ltd. was added in an appropriate amount such that bubbles and the like affecting the measurement were not generated. The analysis conditions are shown below.

Number of measurements: once
Measurement time: 30 seconds
Indication of distribution: volume
Particle size classification: standard
Calculation mode: MT3000II
Solvent name: WATER
Measurement upper limit: 2,000 μm
Measurement lower limit: 0.021 μm
Residue ratio: 0.00
Passage ratio: 0.00
Residue ratio setting: null
Particle transmittance: transmission
Particle refractive index: 1.81
Particle shape: non-spherical
Solvent refractive index: 1.333
DV value: 0.0150 to 0.0700
Transmittance (TR): 0.700 to 0.950
In the measurement result, the value of $D_{50}$ was defined as the average particle size.

<Elemental Metal Content of Raw Material Activated Carbon>

First, calibration curves were prepared for the elemental potassium content and the elemental calcium content using a standard solution having known concentrations.

Next, a raw material activated carbon pulverized to have an average particle size of 20 μm or smaller was dried at 115±5° C. for 3 hours, and 0.1 g of the thus dried raw material activated carbon was placed in a prescribed container. To this container, 10 mL of nitric acid (60.0 to 62.0% by mass) was further added and, after mixing, a pretreatment was performed at a temperature of 210° C. for 1 hour using a microwave sample pretreatment apparatus ("MARS 6" manufactured by CEM Japan Corporation) to degrade the raw material activated carbon.

The resulting solution was taken out and ion-exchanged water was added thereto to a volume of 200 mL so as to prepare a measurement solution, which was subsequently analyzed using a multi-type ICP emission spectrometer ("ICPE-9820" manufactured by Shimadzu Corporation). The concentrations of elemental metals were determined from the thus obtained values and the above-prepared calibration curves, and the elemental potassium content and the elemental calcium content were each calculated using the following formula:

$$\text{Elemental metal content [\% by mass]} = \frac{\text{Elemental metal concentration [mg/L]} \times 10^{-3} \times 0.2\text{[L]}}{\text{Mass of raw material activated carbon [}g\text{]}} \times 100 \quad \text{[Formula 1]}$$

<X-ray Diffraction Pattern of Precursor Activated Carbon (Y)>

The X-ray diffraction pattern of a precursor activated carbon (Y) was measured using an X-ray diffractometer ("RINT 2200" manufactured by Rigaku Corporation). The measurement conditions were as follows.

X-ray output: 40 kV/30 mA
Kα radiation wavelength: CuKα (λ=1.54 Å)
Scanning speed: 2°/min <Pore Volume of Activated Carbon>

The pore volume per mass of an activated carbon was measured using a mercury intrusion porosimetry pore volume analyzer ("MicroActive AutoPore V9600" manufactured by Micromeritics Instrument Corporation). The mercury pressure was set to be from 0.10 psia (about 0.69 kPa) to 61000.00 psia (about 420580.19 kPa).

<SPR Adsorption Amount of Activated Carbon>

For the evaluation of the decolorization performance of each activated carbon of Examples and Comparative Examples, first, each activated carbon was pulverized to an average particle size of 5 to 20 m. Then, for each activated carbon of Examples and Comparative Examples, the SPR adsorption amount was measured by the following procedure.

A 0.1%-by-mass aqueous SPR solution was prepared using SPR and ion-exchanged water. Then, 20 mL of the thus prepared aqueous SPR solution was added to 0.05 g of powder-form activated carbon dried at 115±5° C., and the resultant was shaken for 30 minutes at an amplitude of 160 times/min in a water bath set at 25±1° C. Subsequently, the resultant was suction-filtered, and the thus obtained filtrate was used as a measurement sample. Further, the above-described operations were performed without the activated carbon, and the thus obtained filtrate was used as a blank solution. For the measurement sample and the blank solution which were 100-fold diluted with ion-exchanged water, the absorbance at a wavelength of 520 nm was measured. In this absorbance measurement, an UV-visible spectrophotometer ("UV-MINI 1240" manufactured by Shimadzu Corporation) was used along with a quartz cell (optical path length: 10 mm). The SPR adsorption amount was determined by the following formula.

$$SPR \text{ adsorption amount [mg/g]} = \left\{20 \times \frac{0.1}{100} \times \left[1 - \frac{\text{Absorbance of sample solution at 520 nm}}{\text{Absorbance of blank solution at 520 nm}}\right] \times 1,000\right\} / 0.05$$ [Formula 2]

<MS Hardness of Activated Carbon>

Ten 8-mm steel balls were placed in a steel pot of 25.4 mm in inner diameter and 304.8 mm in length, and about 5.0 g (weighed to the order of 0.1 g) of dried activated carbon was added thereto, after which the pot was tightly sealed. This steel pot was fitted to a measurement instrument and rotated for 40 minutes at a speed of 25 rotations per minute. Thereafter, the sample was taken out and the steel balls were removed, followed by sieving through a 50-mesh sieve (JIS Standard). The ratio of the sample remaining on the sieve with respect to the sample initially added to the steel pot was calculated by the following formula, and the thus obtained value was defined as the MS hardness.

$$MS \text{ hardness [\%]} = \frac{\text{Mass of sample remaining on sieve [g]}}{\text{Mass of sample weighed before test [g]}} \times 100$$ [Formula 3]

<JIS Hardness of Activated Carbon>

The JIS hardness of each activated carbon was measured in accordance with JIS K1474.

Example 1

(1) Preparation of Raw Material Activated Carbon

A char produced from a coconut shell made in Philippines (specific surface area: 370 m²/g) was subjected to primary activation at 850° C. with a mixed gas of propane combustion gas and water vapor (total water vapor partial pressure: 35%) in a rotary kiln, whereby a raw material activated carbon having a specific surface area of 1,141 m²/g and controlled grain size of 10 to 30-mesh sieve (JIS Standard) was obtained.

(2) Production of Activated Carbon

The thus obtained raw material activated carbon in an amount of 1,000 g was immersed into an aqueous calcium nitrate solution (calcium nitrate tetrahydrate: 554.2 g, ion-exchanged water: 2,250 g), stirred at room temperature for 6 hours, filtered, and then dried for 5 to 7 hours in a natural convection constant-temperature dryer set at 115±5° C., whereby the elemental potassium content and the elemental calcium content were adjusted to be 0.2% by mass and 3.5% by mass, respectively.

Subsequently, 450 g of the thus obtained elemental calcium-containing raw material activated carbon was placed in a batch-type rotary kiln set at 500° C. and heated from 500° C. to 920° C. at a rate of 15° C./min in a nitrogen atmosphere to perform a preheating treatment (the retention time of the preheating temperature was 0 minutes), whereby a precursor activated carbon (Y) was obtained. This precursor activated carbon (Y) had a diffraction peak at a diffraction angle 2θ of 37.6±0.3° in its X-ray diffraction pattern. In Table 1 below, this feature is indicated as "present" for "Diffraction peak derived from Ca oxide". In the X-ray diffraction pattern of FIG. 1, the diffraction peak at a diffraction angle 2θ of 37.6±0.3° was derived from calcium oxide.

Thereafter, a mixed gas having a water vapor partial pressure of 40% and a nitrogen partial pressure of 60% was supplied into the rotary kiln at a total gas pressure of 1 atm and a flow rate of 5.0 L/min to perform activation so as to achieve an activation yield of 30%; For the resulting activated product, the packing density was measured in accordance with JIS K1474, and 1,800 mL of hydrochloric acid (1 N) was added to 410 mL (in terms of volume) of the activated product, followed by washing with heating for 1 hour, after which the resultant was thoroughly washed with ion-exchanged water to a pH of 5 to 7 and then dried at 115±5° C. for 4 hours to obtain an activated carbon. The physical properties of the thus obtained activated carbon are shown in Table 1.

Example 2

An elemental calcium-containing raw material activated carbon was obtained in the same manner as in Example 1, except that, as the aqueous calcium nitrate solution into which the raw material activated carbon was immersed, an aqueous calcium nitrate solution (calcium nitrate tetrahydrate: 110.1 g, ion-exchanged water: 2,250 g) was used in place of the aqueous calcium nitrate solution (calcium nitrate tetrahydrate: 554.2 g, ion-exchanged water: 2,250 g). The thus obtained elemental calcium-containing raw material activated carbon had an elemental potassium content of 0.4% by mass and an elemental calcium content of 1.4% by mass.

Subsequently, a precursor activated carbon (Y) was obtained by performing a preheating treatment on the thus obtained elemental calcium-containing raw material activated carbon in the same manner as in Example 1. As shown in FIG. 1, this precursor activated carbon (Y) had a diffraction peak at a diffraction angle 2θ of 37.6±0.3° in its X-ray diffraction pattern. Further, this diffraction peak was derived from calcium oxide.

Thereafter, an activated carbon was obtained in the same manner as in Example 1, except that the above-described precursor activated carbon (Y) was used in place of the precursor activated carbon (Y) used in Example 1, and the activation yield was changed from 30% to 31%. The physical properties of the thus obtained activated carbon are shown in Table 1.

Example 3

An elemental calcium-containing raw material activated carbon was obtained in the same manner as in Example 1, except that, as the aqueous calcium nitrate solution into which the raw material activated carbon was immersed, an aqueous calcium nitrate solution (calcium nitrate tetrahydrate: 55.4 g, ion-exchanged water: 2,250 g) was used in place of the aqueous calcium nitrate solution (calcium nitrate tetrahydrate: 554.2 g, ion-exchanged water: 2,250 g). The thus obtained elemental calcium-containing raw material activated carbon had an elemental potassium content of 0.4% by mass and an elemental calcium content of 0.9% by mass. Further, this elemental calcium-containing raw material activated carbon contained a calcium compound (calcium oxide) having a size large enough to give the specific pore structure of the present invention.

An activated carbon was obtained in the same manner as in Example 1, except that the above-described elemental calcium-containing raw material activated carbon was used in place of the elemental calcium-containing raw material activated carbon used in Example 1. The physical properties of the thus obtained activated carbon are shown in Table 1.

Example 4

An activated carbon was obtained in the same manner as in Example 2, except that the activation yield was changed from 31% to 36%. The physical properties of the thus obtained activated carbon are shown in Table 1.

Reference Example 1

A precursor activated carbon (Y) was obtained in the same manner as in Example 2, except that the retention time of the preheating temperature was changed from 0 minute to 60 minutes. As shown in FIG. 3, this precursor activated carbon (Y) had a diffraction peak at a diffraction angle 2θ of 37.6±0.3° in its X-ray diffraction pattern. Further, this diffraction peak was derived from calcium oxide.

Comparative Example 1

An activated carbon was obtained in the same manner as in Example 1, except that the preheating step was not performed, a fluidized furnace was used for the secondary activation step in place of the batch-type rotary kiln, and the activation yield was changed from 30% to 34%. The physical properties of the thus obtained activated carbon are shown in Table 1. It is noted here that the activation in the fluidized furnace was performed at an activation temperature of 920° C. by supplying a mixed gas having a water vapor partial pressure of 16%, a carbon dioxide partial pressure of 12% and a nitrogen partial pressure of 72% into the fluidized furnace at a total gas pressure of 1 atm and a flow rate of 108.4 L/min. Further, the raw material activated carbon prior to the secondary activation step did not contain a calcium compound (calcium oxide) having a size large enough to give the specific pore structure of the present invention, and did not have a diffraction peak at a diffraction angle 2θ of 37.6±0.3°. In Table 1, this is indicated as "absent" for "Diffraction peak derived from Ca oxide".

Comparative Example 2

An activated carbon was obtained in the same manner as in Example 2, except that the preheating step was not performed, a fluidized furnace was used for the secondary activation step in place of the batch-type rotary kiln, and the activation yield was changed from 31% to 26%. It is noted here that the activation in the fluidized furnace was performed at an activation temperature of 920° C. by supplying a mixed gas having a water vapor partial pressure of 16%, a carbon dioxide partial pressure of 12% and a nitrogen partial pressure of 72% into the fluidized furnace at a total gas pressure of 1 atm and a flow rate of 108.4 L/min. Further, the raw material activated carbon prior to the secondary activation step did not contain a calcium compound (calcium oxide) having a size large enough to give the specific pore structure of the present invention, and did not have a diffraction peak at a diffraction angle 2θ of 37.6±0.3° as shown in FIG. 2. The physical properties of the thus obtained activated carbon are shown in Table 1. The diffraction peak at a diffraction angle 2θ of 29.8±0.3°, which is seen in FIG. 2, is a diffraction peak derived from calcium nitrate tetrahydrate. In this Comparative Example where an elemental calcium source (calcium nitrate) as an aqueous solution was brought into contact with the raw material activated carbon and the preheating step was not performed, it is considered that the calcium compound did not exist at a crystallite size large enough to give the specific pore structure of the present invention but rather existed at a small size; therefore, this diffraction peak is considered to be derived from an aggregate of small-sized calcium compound (calcium nitrate tetrahydrate).

Comparative Example 3

To 2,120 mL of hydrochloric acid (0.3 N), 600 g of the same raw material activated carbon as the one obtained in (1) of Example 1 was added, and the resultant was washed by boiling for 20 minutes and then thoroughly washed with ion-exchanged water to a pH of 5 to 7, followed by 4-hour drying in a natural convection constant-temperature dryer set at 115±5° C. The thus acid-washed raw material activated carbon had an elemental potassium content of 0.0% by mass. Next, 500 g of this acid-washed raw material activated carbon was sprayed with an aqueous calcium nitrate solution (calcium nitrate tetrahydrate: 23 g, ion-exchanged water: 117 g), and subsequently dried for 5 to 7 hours in a natural convection constant-temperature dryer set at 115±5° C. The thus obtained elemental calcium-containing raw material activated carbon had a calcium content of 0.8% by mass. Thereafter, an activated carbon was obtained in the same manner as in Comparative Example 1, except that the activation yield was changed from 34% to 59%. The physical properties of the thus obtained activated carbon are shown in Table 1.

Comparative Example 4

An activated carbon was obtained in the same manner as in Comparative Example 3, except that the activation yield was changed from 59% to 28%. The physical properties of the thus obtained activated carbon are shown in Table 1.

Comparative Example 5

An activated carbon was obtained in the same manner as in Comparative Example 3, except that the activation yield was changed from 59% to 19%. The physical properties of the thus obtained activated carbon are shown in Table 1.

Comparative Example 6

Referring to Example 1 described in Patent Document 3, the same raw material activated carbon as the one obtained in (1) of Example 1 was sprayed with an aqueous calcium chloride solution (calcium chloride: 10 g, ion-exchanged water: 350 g), and dried for 5 to 7 hours in a natural convection constant-temperature dryer set at 115±5° C. An activated carbon was obtained in the same manner as in Example 1, except that the preheating step was not performed, an activation temperature of 900° C. was used in place of 920° C., and the activation yield was changed from 30% to 33%. The physical properties of the thus obtained activated carbon are shown in Table 1.

Comparative Example 7

Referring to Example 2 described in Patent Document 3, an activated carbon was obtained in the same manner as in Comparative Example 6, except that, as the aqueous calcium chloride solution sprayed to the raw material activated carbon, an aqueous calcium chloride solution (calcium chloride: 15 g, ion-exchanged water: 350 g) was used in place of the aqueous calcium chloride solution (calcium chloride: 10 g, ion-exchanged water: 350 g), and the activation yield was changed from 33% to 24%. The physical properties of the thus obtained activated carbon are shown in Table 1.

Comparative Example 8

An activated carbon was obtained in the same manner as in Comparative Example 1, except that the step of adjusting the elemental potassium content and the elemental calcium content in the raw material activated carbon was not performed, and the activation yield was changed from 34% to 37%. The physical properties of the thus obtained activated carbon are shown in Table 1.

None of the raw material activated carbons prior to the secondary activation step in Comparative Examples 3 to 8 contained a calcium compound (calcium oxide) of a size large enough to give the specific pore structure of the present invention.

TABLE 1

| | Elemental K content [% by mass] | Elemental Ca content [% by mass] | Diffraction peak derived from Ca oxide | Activation yield [%] | 6.5-50 nm pore volume (A) [mL/g] | 750-4,000 nm pore volume (B) [mL/g] | Pore volume ratio (A)/(B) [—] | 300-750 nm pore volume (C) [mL/g] | Pore volume ratio (A)/(C) [—] | SPR adsorption amount [mg/g] | MS hardness [%] | JIS hardness [%] |
|---|---|---|---|---|---|---|---|---|---|---|---|---|
| Example 1 | 0.2 | 3.5 | present | 30 | 0.54 | 0.21 | 2.6 | 0.14 | 3.8 | 490 | 69.9 | 82.5 |
| Example 2 | 0.4 | 1.4 | present | 31 | 0.43 | 0.21 | 2.1 | 0.15 | 2.9 | 250 | 70.3 | 88.6 |
| Example 3 | 0.4 | 0.9 | present | 30 | 0.44 | 0.20 | 2.2 | 0.14 | 3.1 | 190 | 73.1 | 87.6 |
| Example 4 | 0.4 | 1.4 | present | 36 | 0.34 | 0.20 | 1.7 | 0.10 | 3.5 | 300 | 70.3 | 89.3 |
| Comparative Example 1 | 0.2 | 3.5 | absent | 34 | 0.77 | 0.24 | 3.2 | 0.18 | 4.4 | 450 | 54.3 | 77.3 |
| Comparative Example 2 | 0.4 | 1.4 | absent | 26 | 0.58 | 0.25 | 2.3 | 0.21 | 2.8 | 350 | 60.5 | 80.1 |
| Comparative Example 3 | 0.0 | 0.8 | absent | 59 | 0.26 | 0.24 | 1.1 | 0.15 | 1.8 | 83 | 68.9 | 94.6 |
| Comparative Example 4 | 0.0 | 0.8 | absent | 28 | 0.57 | 0.25 | 2.3 | 0.24 | 2.3 | 340 | 54.3 | 79.7 |
| Comparative Example 5 | 0.0 | 0.8 | absent | 19 | 0.72 | 0.28 | 2.6 | 0.30 | 2.4 | 440 | 51.4 | 74.4 |
| Comparative Example 6 | 0.7 | 0.8 | absent | 33 | 0.45 | 0.24 | 1.9 | 0.14 | 3.2 | 210 | 67.3 | 86.7 |
| Comparative Example 7 | 0.7 | 1.2 | absent | 24 | 0.81 | 0.46 | 1.8 | 0.30 | 2.7 | 250 | 31.0 | 61.6 |
| Comparative Example 8 | 0.7 | 0.0 | absent | 37 | 0.24 | 0.15 | 1.6 | 0.08 | 2.9 | 57 | 68.5 | 94.0 |

As shown in Table 1, it was demonstrated that the activated carbons obtained in Examples 1 to 4 had both a high MS hardness (excellent mechanical strength) and a high SPR decolorization performance.

On the other hand, the activated carbons obtained in Comparative Examples 1, 2 and 4 to 7, in which the pore volume (B) at a pore diameter of 750 to 4,000 nm was excessively increased, had a lower MS hardness than the activated carbons of Examples. In addition, the activated carbons of Comparative Examples 3 and 8 exhibited a lower SPR decolorization performance than the activated carbons of Examples.

INDUSTRIAL APPLICABILITY

The activated carbon of the present invention has a high hardness and, therefore, can be suitably used for a liquid-phase treatment in an adsorption tower or the like where such a property is required. In addition, since the activated carbon of the present invention exhibits an excellent SPR decolorization performance, it can be suitably used as an activated carbon for removing relatively large molecules from a liquid phase. Moreover, the activated carbon of the present invention can be produced by a method which does not additionally require a special apparatus, a special production process or the like, wherein the content balance of two metal elements are changed and activation after a preheating treatment is performed in the production process; therefore, the activated carbon of the present invention is industrially useful in this respect as well.

The invention claimed is:

1. An activated carbon, having a pore volume (A) of 0.3 to 0.7 mL/g at a pore diameter of 6.5 to 50 nm as determined by mercury intrusion porosimetry, a pore volume (B) of 0.08 to 0.23 mL/g at a pore diameter of 750 to 4,000 nm as determined by mercury intrusion porosimetry, and a pore volume ratio (A)/(B) of 1.7 or higher.

2. The activated carbon according to claim 1, having a pore volume (C) of 0.02 to 0.18 mL/g at a pore diameter of 300 to 750 nm as determined by mercury intrusion porosimetry, and a pore volume ratio (A)/(C) of 2.5 or higher.

3. The activated carbon according to claim 1, wherein the activated carbon is made from coconut.

4. The activated carbon according to claim 1, which is an activated carbon for a liquid-phase treatment.

5. A method of producing the activated carbon according to claim 1, comprising activating a precursor activated carbon having an elemental potassium content of 0.5% by mass or less and an elemental calcium content of 0.4 to 4% by mass.

6. The method according to claim 5, wherein the precursor activated carbon has a diffraction peak at a diffraction angle $2\theta$ of $37.6\pm0.3°$ in an X-ray diffraction pattern.

7. The method according to claim 5, wherein the precursor activated carbon has a diffraction peak derived from calcium oxide in an X-ray diffraction pattern.

8. The method according to claim 5, comprising:
(a) adjusting a raw material activated carbon to have an elemental potassium content of 0.5% by mass or less, if the raw material activated carbon has an elemental potassium content greater than 0.5% by mass;
(b) adjusting the raw material activated carbon to have an elemental calcium content of 0.4 to 4% by mass, if the raw material activated carbon has an elemental calcium content greater than 4% by mass or less than 0.4% by mass;
(c) after the adjustments in (a) and (b), preheating the raw material activated carbon to obtain the precursor activated carbon; and
(d) activating the precursor activated carbon.

* * * * *